US 12,236,511 B2

(12) United States Patent
Mouden

(10) Patent No.: US 12,236,511 B2
(45) Date of Patent: Feb. 25, 2025

(54) SECONDARY DISPLAY TO A PRIMARY DISPLAY WITH AN ANIMATED FEEDBACK INTERFACE

(71) Applicant: NCR Voyix Corporation, Atlanta, GA (US)

(72) Inventor: Bertrand Jean Jacques Mouden, Bures sur Yvette (FR)

(73) Assignee: NCR Voyix Corporation, Atlanta, GA (US)

( * ) Notice: Subject to any disclaimer, the term of this patent is extended or adjusted under 35 U.S.C. 154(b) by 139 days.

(21) Appl. No.: 17/876,980

(22) Filed: Jul. 29, 2022

(65) Prior Publication Data

US 2024/0037828 A1  Feb. 1, 2024

(51) Int. Cl.
*G06T 13/40* (2011.01)
*G06Q 20/18* (2012.01)

(52) U.S. Cl.
CPC .......... *G06T 13/40* (2013.01); *G06Q 20/18* (2013.01)

(58) Field of Classification Search
CPC ........ G06T 13/40; G06Q 20/18; G06Q 20/20; G06F 3/04817; G06F 3/0484; G07F 9/023; G07F 19/20; G07F 19/206; G07F 19/209

USPC ......................................... 345/473
See application file for complete search history.

(56) References Cited

U.S. PATENT DOCUMENTS

| 2005/0086600 | A1* | 4/2005 | Black ............. G06Q 20/1085 715/708 |
| 2013/0179779 | A1* | 7/2013 | Sandler ............. G06F 3/011 715/706 |
| 2019/0240588 | A1* | 8/2019 | Kaku .................. G09G 3/20 |

FOREIGN PATENT DOCUMENTS

WO   WO-2020243847 A1 * 12/2020 ............. G06Q 20/18

* cited by examiner

*Primary Examiner* — Jacinta M Crawford
(74) *Attorney, Agent, or Firm* — Schwegman Lundberg & Woessner, P.A.

(57) ABSTRACT

A terminal with two separate displays is provided. The primary display is controlled by a transaction interface for performing transactions. The secondary display is controlled by an animation interface for rendering animations on the secondary display. An agent provides state transitions in the transaction interface to the animation interface and the animation interface transitions the animations rendered on the secondary display based on state changes reported by the agent. The animations rendered on the secondary display provide guidance, positive, and negative feedback to a consumer performing a transaction on the terminal through the transaction interface.

20 Claims, 6 Drawing Sheets

SECONDARY DISPLAY TO A PRIMARY DISPLAY WITH AN ANIMATED FEEDBACK INTERFACE

BACKGROUND

Operating self-service terminals (SSTs) can be intimidating for consumers especially consumers who are inexperienced with interacting with an SST's interface screens. Consumers become frustrated and request service too frequently, which is expensive for the enterprise that supports the SST.

A variety of interface improvements have been attempted in the industry to address these problems. For example, a consumer may be able to establish a live video feed for assistance and/or access a message-based of voice-based assistance session while interacting with the interface.

Some SSTs also are reluctant to integrate any new software functionality into their interfaces because the SSTs are Automated Teller Machines (ATM), which are secure devices. The fear is that changes to the interface may also provide the opportunity for security holes that thieves can exploit.

Additionally, when the SSTs are not in use by a consumer, enterprises have explored functionality in their interfaces to attack the consumers to use the SSTs. This makes sense because the more use an SST experiences, the more revenue and consumer loyalty the business experiences.

Furthermore, most SSTs have a single display for a variety of reasons. The available physical space available on the display limits the extent to which a given enterprise can provide effective assistance and/or provide functionality to attack consumers when an SST is idle and not in use by any consumer.

SUMMARY

In various embodiments, methods and a terminal are presented for a secondary display to a primary display with an animated feedback interface. A dual display terminal is provided. One display is associated with transaction processing for transactions using a transaction interface. The other display is controlled by an animated feedback interface. An agent provides state changes in the transaction interface to the animated feedback interface. The animated feedback interface renders animated eyes in various expressions or emotions in animated interface screens based on the state changes in the transaction interface. The animation is composed of a video sequences or sub-animations with smooth transitions between the expressions or emotions expressed by the eyes. The animation provides a universally understood visual depiction of language that give guidance (for example, looking in the direction of a peripheral that is to be used for the transaction state), positive and negative feedback to a consumer operating the terminal for a transaction.

According to an aspect, a terminal is provided with a secondary display to a primary display with an animated feedback interface. The terminal includes a primary display, a secondary display, a processor, a non-transitory computer-readable storage medium having executable instructions for a transaction interface, an animation interface, and an agent. When the executable instructions are executed by the processor, this causes the processor to perform operations. The operations include rendering, by the animation interface, a first animation on the secondary display when the agent is reporting an idle state for the terminal; rendering, by the animation interface, a transition to a second animation on the secondary display when the agent is reporting a transaction-initiated state on the terminal through the transaction interface; rendering, by the transaction interface, transaction interface screens on the primary display during the transaction; and simultaneously rendering, by the animation interface, second transactions to third animations on the secondary display as the agent reports state changes in the transaction interface during the transaction to provide feedback to a consumer performing the transaction on the terminal during the transaction.

DETAILED DESCRIPTION

As stated above, SSTs and their interfaces are often cumbersome and difficult to operate by consumers. In fact, some consumers would rather visit a bank branch in person during branch business hours than use an ATM. Moreover, most SSTs have a single display, which restricts the functionality that enterprises can provide via their SSTs.

The teachings that follow provide methods and a terminal. The terminal includes two separate displays, one for transaction and associated with the terminals transaction interface (a primary display) and one that includes an animated feedback interface (a secondary display). The animated feedback interface renders animated screens depicting various types of eyes and expression of those eyes. The expressions are correlated and synched to the state of the transaction being processed by the transaction interface through transaction interface screens rendered on the primary display.

This provides a universally understood type of visual language to the consumers and conveys feedback for their transaction. This also makes the consumer engage more with the transaction interface, not fear using the SST, encourages more consumer usage of the SST, and makes the experience of the consumer more enjoyable and fun overall all while providing feedback assistance to the consumer during the consumer's transaction.

As a result, the SST experiences less requests for customer assistance while the SST also experiences an increase in consumer usage. In an embodiment, the animated eyes can be branded by an organization or an enterprise to customize and promote the organization through the unique visual appearance of the animated eyes and their corresponding expressions rendered in the interface screens of the animated interface on the secondary display. The branding may provide the enterprise that supports and provides the SST another source of revenue through licensing of the branded animated eyes.

Figure 1A:
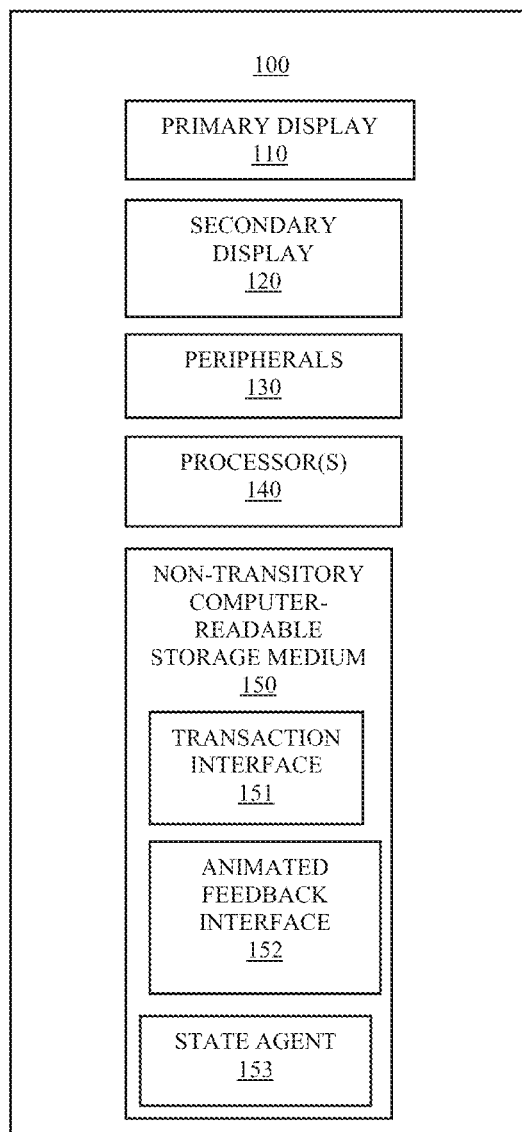
FIG. 1A is a diagram of a terminal with a secondary display to a primary display and having an animated feedback interface, according to an example embodiment.

FIG. 1A is a diagram of a terminal 100 with a secondary display to a primary display and having an animated feedback interface, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or fewer components are possible without departing from the teachings of providing a secondary display to a primary display having an animated feedback interface as presented herein and below.

Terminal 100 includes a primary display 110, a secondary display, peripherals 130, one or more processors, and a non-transitory computer-readable storage medium 150. Medium 150 includes executable instructions for a transaction interface 151 associated with the primary display 110, an animated feedback interface 152 associated with the secondary display 120, and a state agent 153. When the executable instructions are executed from medium 150 this causes the processor 140 to perform operations discussed herein and below with respect to 151-153.

State agent 153 monitors workflows associated with transactions or when there are no transactions being processed on terminal 100. When a state changes, the change in state is reported to animated feedback interface. The states may include, by way of example only, idle (no transaction being processed), transaction initiated, type of transaction, workflow state within the type of transaction, and transaction end. The types of transaction may vary based on what type of terminal 100 is being employed. The types of terminals 100 may include an Automated Teller Machine (ATM), a self-service terminal (SST), a fuel kiosk, a travel kiosk, a point-of-sale (POS) terminal, an entertainment kiosk, a reservation kiosk, and informational kiosk, etc. For example, an ATM may have transaction types associated with a withdrawal, a deposit, a balance inquiry, a funds transfer, etc.

Initially, when the state for the terminal 100 is idle, the animated feedback interface 152 renders animations associated with grabbing the attention of a passerby. The animation may include eyes expression various emotions. The animation is not a static presentation or rendering of a pair of eyes with a specific emotion; rather, the eyes appear "alive" and smoothly transition from different degrees or a specific emotion or between various predefined emotions. Simultaneously, during the idle state, the transaction interface 151 may display advertisements, promotions, etc. This allows the enterprise associated with terminal 100 to maximize the screen space on the secondary display 120 with the animations using the animated feedback interface 152 and maximize the screen space on the primary display 110 with advertisements, informative messages, promotions, etc. The animation played on the second display 120 will attract consumers more than will advertisements or promotions but once attracted to the terminal 100, the consumers will notice and likely pay attention to or respond to the advertisements, promotions, etc. associated with the primary display 110.

The transaction interface 151 renders transaction screens on primary display 110 and permits the terminal 100 to process transactions. During the transactions, state agent 153 provides the state to animated feedback interface 152 this allows the animation being played to transaction to various universally and visually understood emotions or expressions that provided guidance, positive or negative feedback to the consumer operating the terminal 100. This allows the transaction to progress in a stress-free manner where the consumer is being guided with feedback through the animation.

Figure 1B:
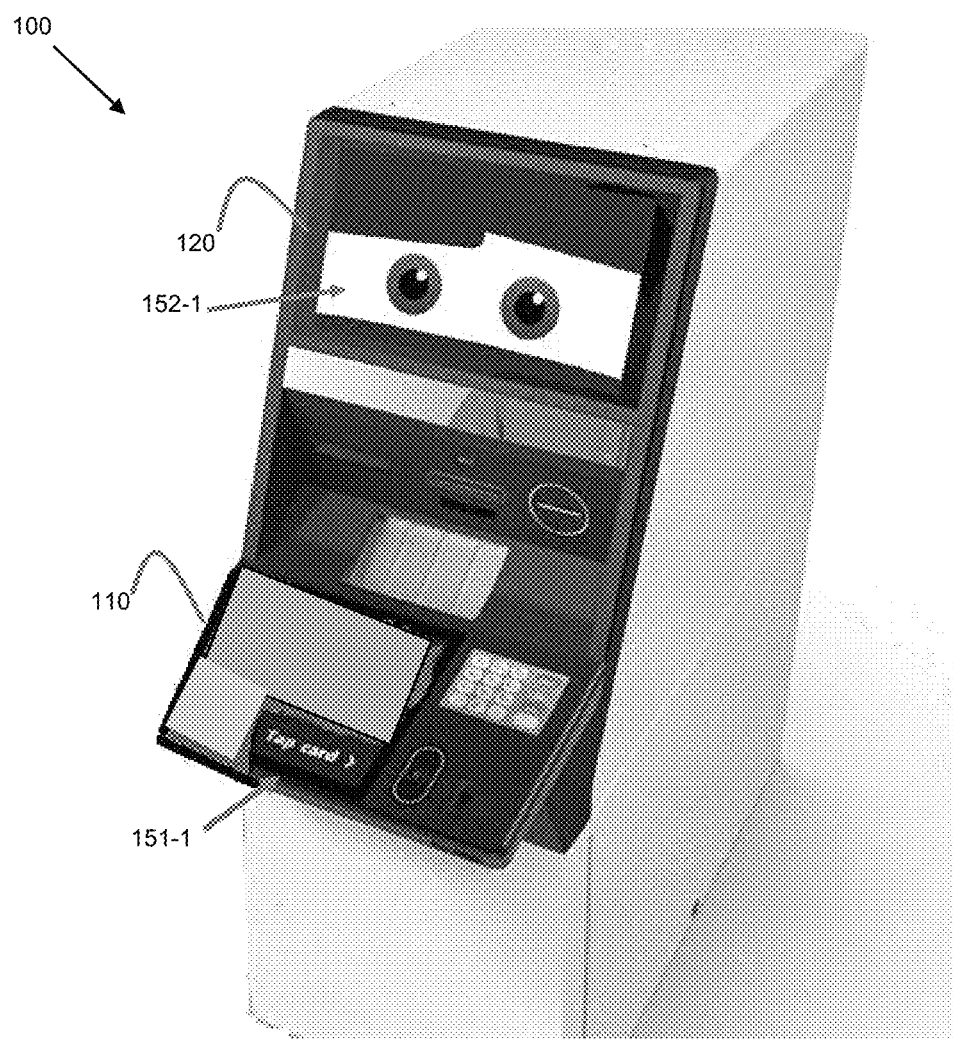
FIG. 1B is another diagram a terminal with a secondary display to a primary display depicting an animated feedback interface screen on the secondary display, according to an example embodiment.

FIG. 1B is another diagram a terminal 100 with a secondary display 120 to a primary display 110 depicting an animated feedback interface screen 152 on the secondary display 120, according to an example embodiment. The animated interface screen 152-1 rendered by the animated interface 152 depicts animated eyes expressing a confused or sad look as if to say come visit me or use me. Simultaneously, the primary display 110 displays a transaction interface screen 151-1 rendered by the transaction interface 151 with a message indicating "tap card here" to begin a transaction.

Figure 1C:
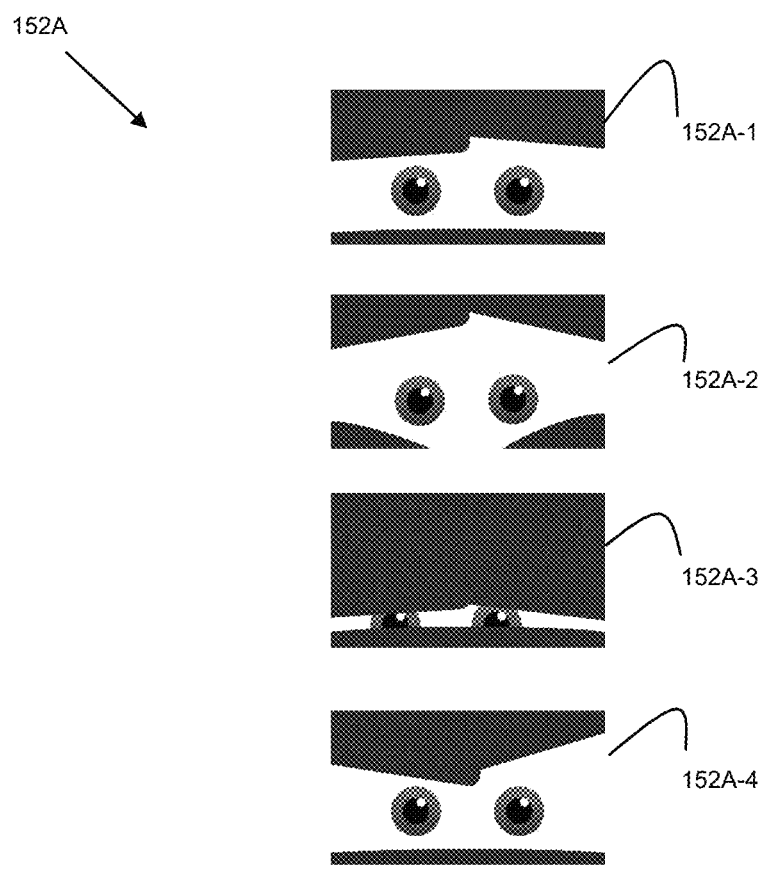
FIG. 1C is a diagram of interface screens for the animated feedback interface, according to an example embodiment.

FIG. 1C is a diagram of interface screens 152A for the animated feedback interface 152, according to an example embodiment. FIG. 1C is intended to illustrate some of the animated expressions or animated emotions that can be rendered by the animated feedback interface 152. It is to be noted that other emotions or expressions may be rendered and or customized as desired.

Screen 152A-1 depicts a set of neutral or almost expressionless eyes. Screen 152A-2 depicts a set of happy or excited eyes. Screen 152A-3 depicts a set of looking around or suspicious eyes. Screen 152A-2 depicts a set of unhappy or angry eyes. Again, any number of expressions can be used in the animations, for example, hiding, watching, laughing, etc.

Figure 1D:
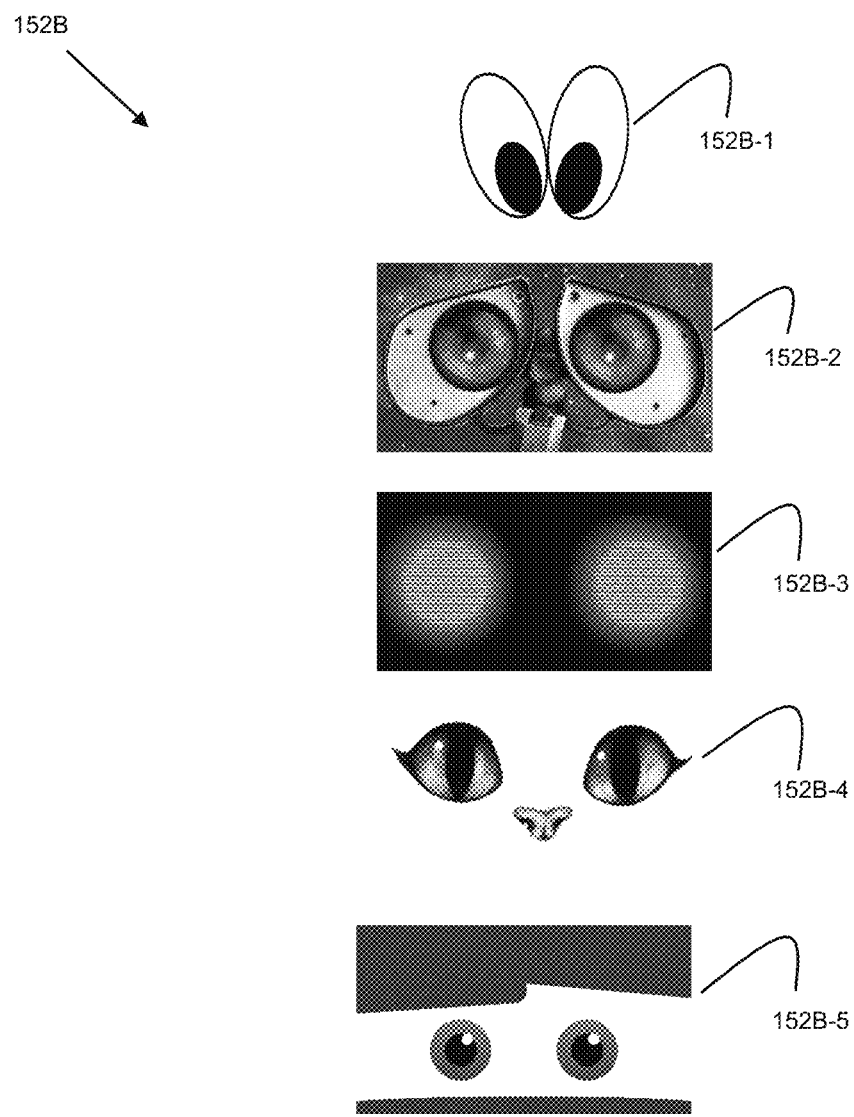
FIG. 1D is a diagram of another set of interface screens for the animated feedback interface, according to an example embodiment.

FIG. 1D is a diagram of another set of interface screens 152B for the animated feedback interface 152, according to an example embodiment. The interface screens 152 are intended to illustrate that the set of eyes themselves can be branded by an enterprise or for specific purposes.

Screen 152B-1 shows eyes branded as a mouse. Screens 152B-2 and 152B-3 shows eyes branded as a specific animated characters. Screen 152-4 shows eyes branded as eve while screen 152-4 shows eyes branded as a cat. Again, any number of brandings of the base eyes used in the animations rendered by the animated interface 152 can be used by an enterprise for any desired purposes.

As an example, consider an amusement park where there are a plurality of available ATMs. One ATM is terminal 100 which includes the secondary display 120 and animation rendered screens for a park character. Suppose that the parents need to withdraw money while at the park and have options to use any available ATM. A child of the parents is more likely to request that the parents take the money out of terminal 100.

In an embodiment, for each transaction type on each terminal type of a given terminal 100, a set of predefined animations are played during a transaction. Again, the animations are not still images but are video or small animations that is continuously changing a little bit and smoothly transitions with each state of the transaction.

In an embodiment, the animation rendered by the animation interface 152 when the terminal 100 is in an idle state is an animated video depicting a set of eyes that are looking or wandering around. As soon a consumer provides a card at the terminal 100 for a transaction, the eyes and video transition to a happy set of eyes and then follow the predefined animations for the state of the transaction as the customer transacts on the terminal 100.

In an embodiment, the animated eyes can serve as a concierge, ready to assist anyone visiting a specific location associated with the terminal 110, for example an amusement park. Simultaneously, the primary display controlled by the transaction interface 151 may render screens with park information or park advertisements.

The animations do not flicker or jump but are smoot animated video of transitions to the animated eyes. The agent 153 provides the state of a given transaction and whatever animation was being presented is smoothly transitioned in the video of the eyes to the expression that is associated with that state. For example, idle shows looking around eyes, when the agent reports a card was presented the looking around eyes gradually transaction from its existing appearance in the video to happy eyes.

In an embodiment, when the terminal 100 is equipped with a consumer presence detector (for example, a motion detector, or face detection from a camera), agent 153 may receive the presence state from the core terminal application. This is even before any transaction is initiated through transaction interface 151 or before any card is presented by a consumer.

In an embodiment, the animations can be created to create different consumer experiences. This allows each enterprise to customize the animations based on their experience and knowledge of their customer base.

In an embodiment, the animated eyes can be of an existing character (branded) or abstract so as to not be associated with any particular branding. So, the base animated eyes are customizable, the expressions or emotions are customizable, and the state transitions within the video of the expressions are customizable.

In an embodiment, terminal 100 is also equipped with a voice-assistance bot that engages the consumer in a conversation and provides state information about the conversation to agent 153. This allows the animated eyes to appear to be a real-life assistant to the consumer while at the terminal. In this embodiment, the consumer need not even transaction via the transaction interface 151, since if all the consumer requires is information through the conversational bot, the consumer just interacts through voice with the bot at the terminal 100 while watching the synchronized animations of the eyes that are in synch with the conversation as it progresses at the terminal 100.

Figure 2:
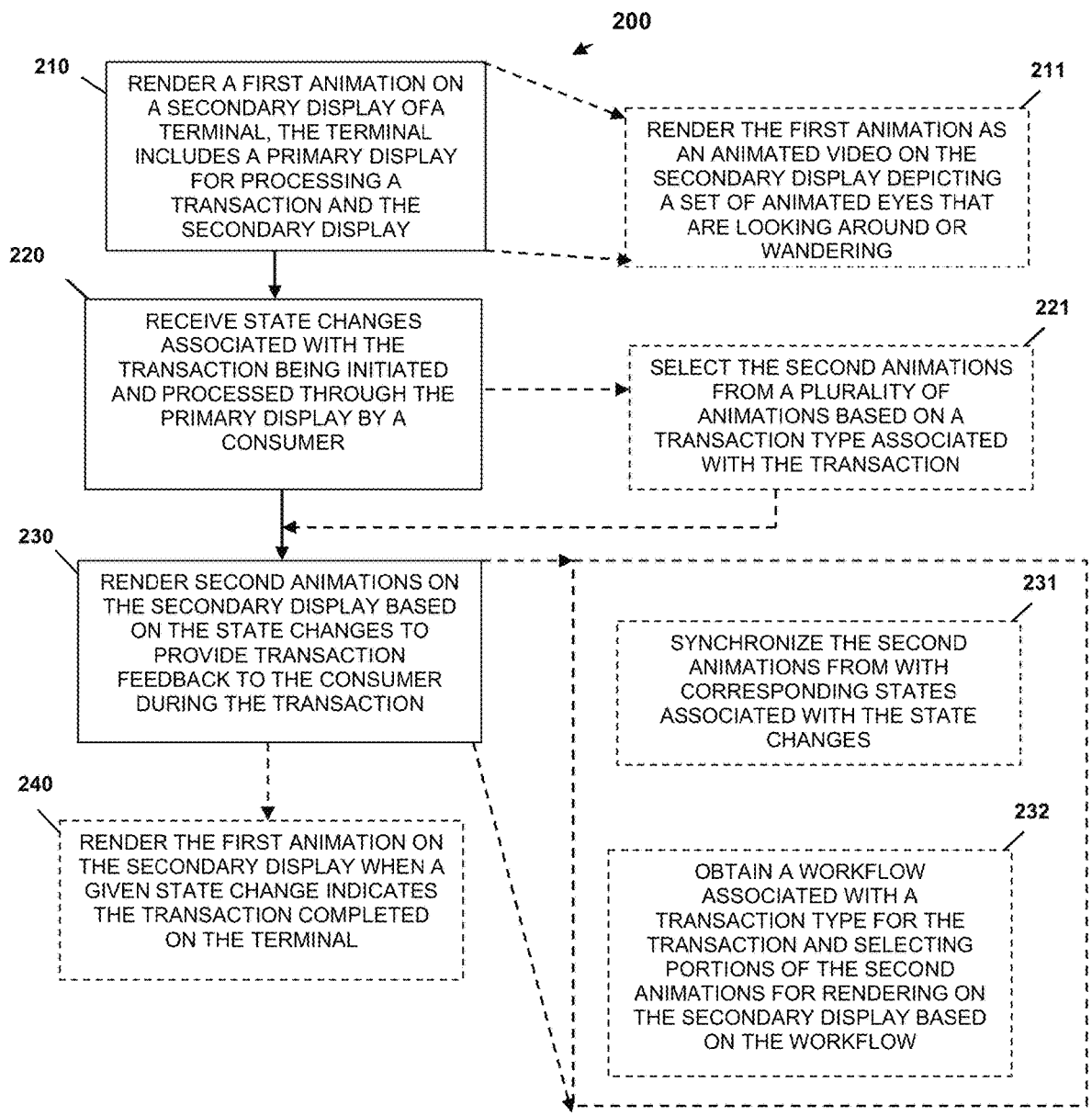
FIG. 2 is a diagram of a method for operating an animated interface screen for a second display to a primary display, according to an example embodiment.

The above-referenced embodiments and other embodiments are now discussed with reference to FIG. 2. FIG. 2 is a diagram of a method for operating an animated interface screen for a second display to a primary display, according to an example embodiment. The method is implemented as one or more software modules referred to as an "animated assistant." The executable instructions associated with the animated assistance are executed by a processor that is configured to perform operations defined by the instructions. The animated assistant may or may not have a network connection and any network connection may be wired, wireless, or a combination of wired and wireless.

In an embodiment, the device that executes the animated assistant is terminal 100. In an embodiment, terminal 100 is an ATM, an SST, a POS terminal, a fuel kiosk, an entertainment kiosk, a travel kiosk, a reservation kiosk, or an informational kiosk.

In an embodiment, the animated assistant is all, or some combination of, animated feedback interface 152 and/or agent 153. In an embodiment, the animated assistant presents another and an enhanced processing perspective from that which was described above for FIGS. 1A-1D.

At 210, the animated assistant renders a first animation on a secondary display 120 of a terminal 100. The terminal 100 includes a primary display 110 for processing a transaction and the secondary display 120.

In an embodiment, at 211, the animated assistant renders the first animation as an animated video on the secondary display 120 depicting a set of animated eyes that are looking around. This is to attract a consumer to come to the terminal 100 and use the terminal 100 when the terminal 100 is not in use.

At 220, the animated assistant receives state changes associated with the transaction being initiated and processed through the primary display 110 by a consumer. This can be reported by agent 153 to the animated assistant; agent 153 monitors the states of transaction interface 152.

In an embodiment, at 221, the animated assistant selects the second animations from a plurality of animations based on a transaction type associated with the transaction. For example, a withdrawal transaction at an ATM 100 may have a different second animation from that which is associated with a deposit transaction.

At 230, the animated assistant renders the second animations on the secondary display 120 based on the state changes to provide transaction feedback to the consumer during the transaction. The second animations are designed to provide guidance, positive, and negative feedback to the consumer during the transaction on the secondary display 120.

In an embodiment, at 231, the animated assistant synchronizes the second animations from corresponding states associated with the state changes. That is, as state change so do the animations being presented in the second animations.

In an embodiment, at 232, the animated assistant obtains a workflow associated with a transaction type for the transaction. The animated assistant selects portions of the second animations for rendering on the secondary display 120 based on the workflow and the state changes within the workflow.

In an embodiment, at 240, the animated assistant renders the first animation on the secondary display 120 when a given state change indicates the transaction completed on the terminal 100. The animated assistant may loop back to the original animation after the transaction completes or select a different first animation from a set of first animations that the animated assistant cycles through between transactions.

Figure 3:
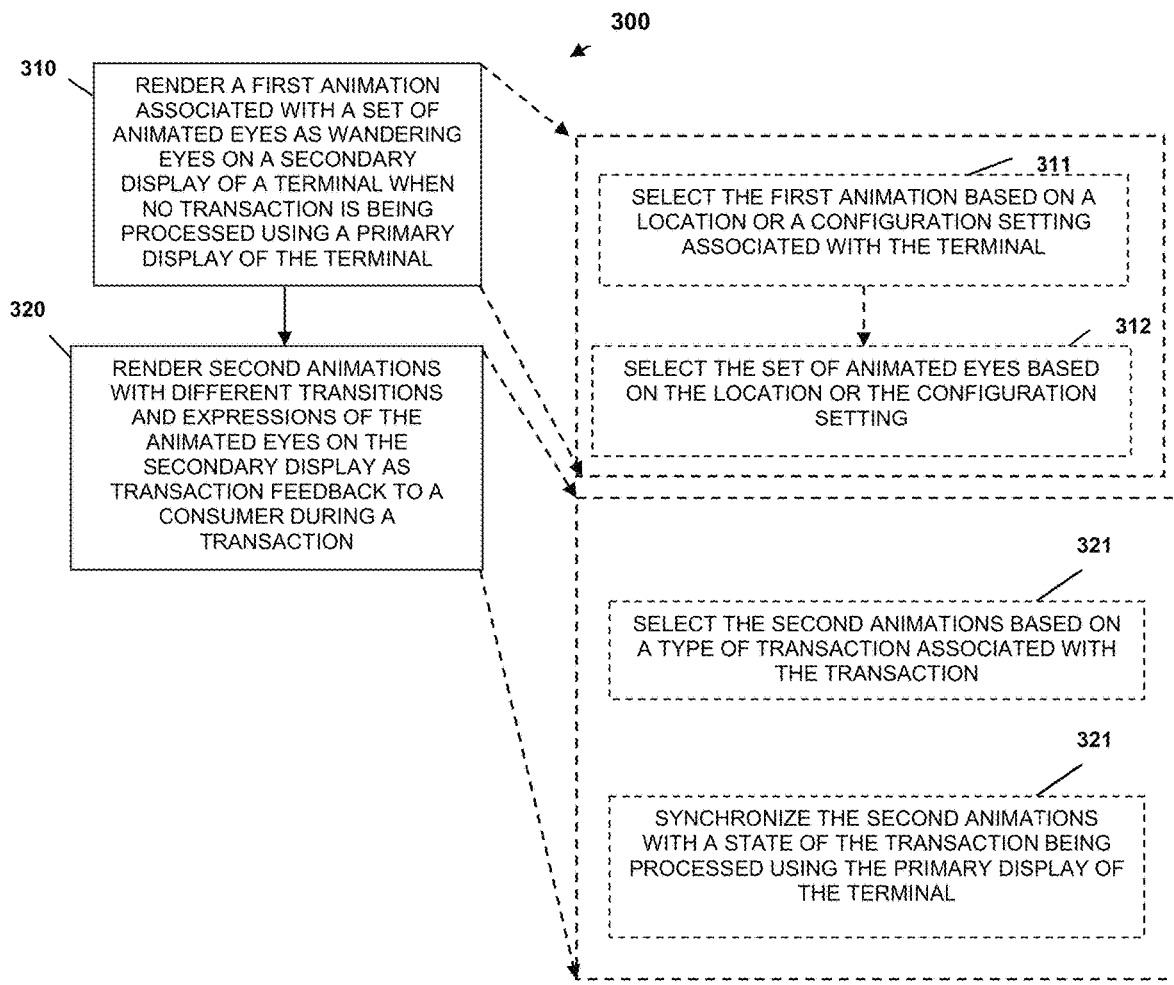
FIG. 3 is a diagram of another method for operating an animated interface screen for a second display to a primary display, according to an example embodiment.

FIG. 3 is a diagram of another method 300 for operating an animated interface screen for a second display to a primary display, according to an example embodiment. The method 300 is implemented as executable instructions referred to herein as an "animated feedback manager." The animated feedback manager is executed by a processor, which cause the processor to perform operations discussed with method 300. The animated feedback manager may or may not have access to a network connection and any network connection may be wired, wireless, or a combination of wired and wireless.

In an embodiment, the device that executes the animated feedback manager is terminal 100. In an embodiment, terminal 100 is an ATM, an SST, a POS terminal, a fuel kiosk, an entertainment kiosk, a travel kiosk, a reservation kiosk, or an informational kiosk.

In an embodiment, the animated feedback manager is all, or some combination of, animated feedback interface 152, agent 153, and/or method 200. In an embodiment, the animated feedback manager presents another and an enhanced processing perspective from that which was described above for FIGS. 1A-1D and method 200 of FIG. 2.

At 310, the animated feedback manager renders a first animation associated with a set of wandering eyes on a secondary display 120 of a terminal 100. This is when no transaction is being processed using a primary display 110 of the terminal 100.

In an embodiment, at 311, the animated feedback manager selects the first animation based on a location of a configuration setting associated with the terminal 100. The animated feedback manager can select the first animation based on a desired purpose of an operator of the terminal that is either captured in the location of the terminal 100 or in a configuration setting associated with the terminal 100.

In an embodiment, at 312, the animated feedback manager selects the set of animated eyes based on a location or the configuration setting. Here, the animated eyes may be branded based on the location or the configuration setting.

At 320, the animated feedback manager renders second animations with different transitions and expressions of the animated eyes on the secondary display 120 as transaction feedback to a consumer during a transaction. The expressions of the animated eyes are a universal visually understood language that is independent of spoken language and understood easily by the consumer as either guidance, positive, or negative feedback during the transaction.

In an embodiment, at 321, the animated feedback manager selects the second animations based on a type of transaction associated with the transaction. That is, each type of transaction may have a set of second animations that the animated feedback manager can select from once the transaction type is known and reported by agent 153.

In an embodiment, at 322, the animated feedback manager synchronizes the second animations with a state of the transaction being processed using the primary display 110 of the terminal 100. That is any particular expression of the eyes and animation of the eyes is correlated with the current transaction state of the transaction.

It should be appreciated that where software/firmware is described in a particular form (such as a component or module) this is merely to aid understanding and is not intended to limit how software/firmware that implements those functions may be architected or structured. For example, modules are illustrated as separate modules, but may be implemented as homogenous code, as individual components, some, but not all of these modules may be combined, or the functions may be implemented in software/firmware structured in any other convenient manner.

Furthermore, although the software/firmware modules are illustrated as executing on one piece of hardware, the software/firmware may be distributed over multiple processors or in any other convenient manner. The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A terminal, comprising:
a primary display;
a secondary display;
a processor;
a non-transitory computer-readable storage medium comprising executable instructions for a transaction interface, an animation interface, and an agent;
the executable instructions when executed by the processor from the non-transitory computer-readable storage medium causes the processor to perform operations comprising:
rendering, by the animation interface, a first animation on the secondary display when the agent is reporting an idle state for the terminal;
rendering, by the animation interface, a transition to a second animation on the secondary display when the agent is reporting a transaction-initiated state on the terminal through the transaction interface;
rendering, by the transaction interface, transaction interface screens on the primary display during the transaction; and
simultaneously rendering, by the animation interface, second transactions to third animations on the secondary display as the agent reports state changes in the transaction interface during the transaction to provide feedback to a consumer performing the transaction on the terminal during the transaction, wherein the first animation, the second animation, and the third animation are video sequences or sub-animations with smooth transitions between expressions or emotions expressed by animated eyes, and wherein the first animation, the second animation, and the third animation provide universally understood visual depiction of language that gives guidance, positive, and negative feedback to the consumer operating the terminal through the transaction.

2. The terminal of claim 1, wherein the first animation, the second animation, and the third animations comprise a set of the animated eyes transitioning between various ones of the expressions or the emotions.

3. The terminal of claim 2, wherein the set of the animated eyes are custom branded based on a location of the terminal.

4. The terminal of claim 1, wherein the terminal is an Automated Teller Machine (ATM), a self-service terminal (SST), a point-of-sale (POS) terminal, a fuel kiosk, and entertainment kiosk, a travel kiosk, a reservation kiosk, or an informational kiosk.

5. The terminal of claim 1, wherein the first animation is a set of the animated eyes that are looking around or wandering around.

6. The terminal of claim 5, wherein the second animation is the set of the animated eyes that transition from looking or wandering around to an appearance associated with being happy or being surprised.

7. The terminal of claim 6, wherein the third animations are a predefined set of animations for the set of the animated eyes that are based on the state changes and a workflow associated with a type of the transaction being performed on the terminal.

8. The terminal of claim 1, wherein the executable instructions are further associated with a voice-assisted bot that when executed by the processor further cause the processor to perform additional operations comprising:

engaging, by the voice-assisted bot, the consumer in a conversation;

reporting, by the agent, conversation states to the animated interface; and rendering, by the animated interface, fourth animations on the secondary display that correspond with and are in synchronization with the conversation states.

9. The terminal of claim 1, wherein the executable instructions are further associated with a person-detector that when executed by the processor further cause the processor to perform additional operations comprising:

reporting, by the person detector, the consumer present at the terminal before the transaction is initiated on the terminal with the transaction interface;

reporting, by the agent, a presence of the consumer before the transaction is initiated on the terminal; and modifying, by the animated interface, the first animation on the secondary display based on the presence.

10. A method, comprising:

rendering a first animation on a secondary display of a terminal, wherein the terminal comprises a primary display for processing a transaction and the secondary display;

receiving state changes associated with the transaction being initiated and processed through the primary display by a consumer; and rendering second animations on the secondary display based on the state changes to provide transaction feedback to the consumer during the transaction, wherein the first animation and the second animations are video sequences or sub-animations with smooth transitions between expressions or emotions expressed by animated eyes, and wherein the first animation and the second animations provide universally understood visual depiction that gives guidance, positive, and negative feedback to the consumer operating the terminal for the transaction.

11. The method of claim 10 further comprising, rendering the first animation on the secondary display when a given state change indicates the transaction completed on the terminal.

12. The method of claim 10, wherein rendering the first animation further includes rendering the first animation as an animated video on the secondary display depicting a set of the animated eyes that are looking around or wandering.

13. The method of claim 10, wherein receiving further includes selecting the second animations from a plurality of animations based on a transaction type associated with the transaction.

14. The method of claim 10, wherein rendering the second animations further includes synchronizing the second animations with corresponding states associated with the state changes.

15. The method of claim 10, wherein rendering the second animations further includes obtaining a workflow associated with a transaction type of the transaction and selecting portions of the second animations based on the workflow.

16. A method comprising:

rendering a first animation associated with a set of animated eyes as wandering eyes on a secondary display of a terminal when no transaction is being processed using a primary display of the terminal; and rendering second animations with different transitions and expressions of the set of animated eyes as transaction feedback to a consumer during a transaction, wherein the second animations are synchronized with real-time transaction states reported by a state agent, providing guidance, positive, and negative feedback based on the transaction's progress, wherein the first animation and the second animations are video sequences or sub-animations with smooth transitions between expressions or emotions expressed by the animated eyes, and wherein the first animation and the second animations provide a universally understood visual depiction of language that gives guidance to the consumer operating the terminal for the transaction.

17. The method of claim 16, wherein rendering the first animation further includes selecting the first animation based on a location or a configuration setting associated with the terminal.

18. The method of claim 17, wherein rendering the first animation further includes selecting the set of the animated eyes based on the location or the configuration setting.

19. The method of claim 16, wherein rendering the second animations further includes selecting the second animations based on a type of transaction associated with the transaction.

20. The method of claim 16 wherein rendering the second animations further includes synchronizing the second animations with a state of the transaction being processed using the primary display of the terminal.

* * * * *